United States Patent [19]

Stopponi et al.

[11] Patent Number: 5,175,196
[45] Date of Patent: Dec. 29, 1992

[54] HOLLOW FIBRES OF MODIFIED POLY-(2,6-DIMETHYL-P-OXY-PHENYLENE)

[75] Inventors: Alessandro Stopponi; Claudio Demofonti; Claudio Valentini; Raffaello Sisto, all of Rome; Ugo Pedretti, Milan, all of Italy

[73] Assignee: Eniricerche S.p.A., Milan, Italy

[21] Appl. No.: 897,884

[22] Filed: Jun. 12, 1992

[30] Foreign Application Priority Data

Jun. 20, 1991 [IT] Italy .................. 1697 A/91

[51] Int. Cl.$^5$ .................. C08J 9/34; D01F 11/02; D01F 2/06
[52] U.S. Cl. .................. 521/180; 264/45.5; 264/193; 264/196; 264/197; 264/198; 264/150; 521/51; 55/16
[58] Field of Search ............ 521/180, 51; 55/16; 264/197, 198, 193, 196

[56] References Cited

U.S. PATENT DOCUMENTS

| | | | |
|---|---|---|---|
| 3,402,144 | 9/1968 | Hay | 525/390 |
| 3,442,858 | 5/1969 | Hay | 525/905 |
| 3,522,326 | 7/1970 | Bostick et al. | 525/391 |

FOREIGN PATENT DOCUMENTS

| | | |
|---|---|---|
| 131559 | 6/1984 | European Pat. Off. |
| 360318 | 8/1989 | European Pat. Off. |

OTHER PUBLICATIONS

Vol. 11, No. 251 (C-440)(2698) Aug. 14, 1987 & JP-A-62 057 915 (Sumitomo Electrical Ind., Ltd.) Mar. 13, 1987 *abstract*.

Primary Examiner—Morton Foelak
Attorney, Agent, or Firm—Shea & Gould

[57] ABSTRACT

A hollow fiber of amorphous, hydroxy-ethylated poly-(2,6-dimethyl-p-oxyphenylene) (PPO-OH) with a glass transition temperature (Tg) of from 180° to 200° C. is disclosed, which is formed by a high-density, microporous layer on a macroporous backing, and having an outer diameter comprised within the range of from 450 to 550 μm and an inner diameter comprised within the range of from 250 to 400 μm.

The process for preparing the hollow fibre and the use of said fibre in the processes of separation of gas mixtures are disclosed as well.

3 Claims, No Drawings

HOLLOW FIBRES OF MODIFIED POLY-(2,6-DIMETHYL-P-OXY-PHENYLENE)

The present invention relates to a hollow fiber of amorphous, hydroxy-ethylated poly-(2,6-dimethyl-p-oxyphenylene) (PPO—OH), to the process for preparing it and to its use in the processes of separation of gas mixtures.

In the art, gas-pervious polymeric membranes are known, to be used in the processes of separation of gas mixtures. The polymers useful for that purpose can be selected from a wide range, such as from silicone rubbers, natural rubber, butyl rubber, low-density polyethylene, polycarbonate, polysulfone, poly-(2,6-dimethyl-p-oxyphenylene), polyarylates, polystyrene and cellulose acetate, as described, e.g., by S. A. Stern, ACHEMA 1985, Plenary Lecture; H. B. Hopfenberg and V. T. Stannet in "Materials Science of Synthetic Membranes", ACS Symposium, Series No. 269, Chapter 2; and T. A. Barbari, W. J. Koros and D. R. Paul in Journal of Membrane Science, 42 (1989), 69–86.

Among these polymers, poly-(2,6-dimethyl-p-oxyphenylene) shows interesting characteristics of permeability and selectivity, inhering in the material itself. However, the use of such a polymer in membrane gas separation devices is hindered by the poor solubility in polar, aprotic solvents miscible with water—such a solubility constitutes an essential condition for asymmetric membranes to be produced by phase reversal, with the use of water as the coagulation agent. The precipitation by phase reversal in a technique to produce membranes, in which the thickness of the active layer in the separation can be easily reduced down to values of the order of magnitude of microns, or less, and wherein the higher-porosity region, not active in the separation, performs a support function.

In European patent application publication No. 360,318, a hydroxy-ethylated poly-(2,6-dimethyl-p-oxyphenylene) is disclosed, which overcomes the above cited problems thanks to its solubility in the normal aprotic solvents miscible with water, and can hence be used in the preparation of asymmetric membranes by the phase-reversal technique.

On the contrary, the preparation of hollow fibres by starting from such a hydroxy-ethylated poly-(2,6-dimethyl-p-oxyphenylene) has not been described in the art, in spite of the desirability of such a physical form in the processes of separation of the gas mixtures.

The hollow fibers, used in the processes of dialysis, ultrafiltration and separation of gas mixtures are, per se, known in the art; the general processes for preparing them, such as disclosed in U.S. Pat. No. 4,830,796 and in European pat. appln. publ. No. 131,559, are known as well. However, the application of these general techniques to the formation of hollow fibers from hydroxy-ethylated poly-(2,6-di-methyl-p-oxyphenylene) does not allow a satisfactory product to be obtained, in particular as regards the morphology of the fibre, and the presence of structural defects.

Therefore, the purpose of the present invention is overcoming the drawbacks which affect the prior art, which have been briefly mentioned hereinabove.

More particularly, a purpose of the present invention is a hollow fibre of hydroxy-ethylated poly-(2,6-di-methyl-p-oxyphenylene), which fibre is endowed with good rheologic characteristics, is free, or essentially free, from structural defects and is endowed with good values of permeance in the processes of separation of gas mixtures.

Another purpose of the present invention is a process for preparing said hollow fibre.

A further purpose of the present invention is the use of said hollow fibre in the processes of separation of gas mixtures.

Still other purposes of the invention will be clear from the following disclosure.

The hollow fibre according to the present invention is a hollow fibre of amorphous, hydroxyethylated poly-(2,6-dimethyl-p-oxyphenylene) (PPO—OH) with glass transition temperatures (Tg) of from 180° to 200° C., containing in its macromolecule the following units:

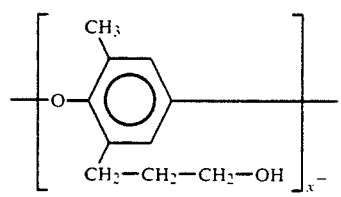

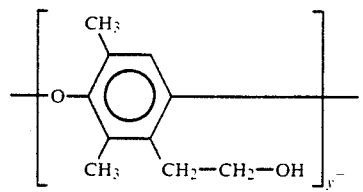

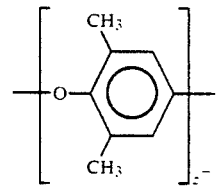

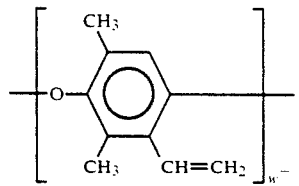

wherein the monomeric units are randomly distributed along the macromolecular chain, and wherein, per each 100 total units, the sum of $(x+y+z+w)=100$, the x units are comprised within the range of from 30 to 40, the y units are comprised within the range of from 10 to 20, the z units are comprised within the range of from 30 to 60, the w units are comprised within the range of from 0 to 10; with the fibre furthermore consisting of a thin, dense, layer on a macroporous backing, and having an outer diameter comprised within the range of from 450 to 550 μm; and an inner diameter comprised within the range of from 250 to 400 μm.

In the preferred form of practical embodiment, per each 100 total units in PPO—OH molecule, the x units are comprised within the range of from 33 to 38, the y units are comprised within the range of from 13 to 18, the z units are comprised within the range of from 39 to 54, the w units are comprised within the range of from 0 to 5.

The hollow fibres made from PPO—OH according to the present invention normally show the permeance values of $\geq 0.5$ for oxygen, of $\geq 0.2$ for nitrogen, of $\geq 2$ for carbon dioxide and, for methane, of $\geq 0.4 \times 10^{31\ 6}$ [STP] $cm^3/cm^2 \cdot s \cdot cm_{Hg}$.

According to another aspect thereof, the present invention relates to a process for preparing a hollow fibre of PPO—OH, which process is characterized in that:

(a) a solution in 1-formyl-piperidine ("viscose") of a PPO—OH having the characteristics specified hereinabove is prepared;

(b) said viscose is extruded through a spinnerette with annular cross-section, provided with a bore internal to the annular opening;

(c) to the central bore of the spinnerette water is fed to cause a partial coagulation to take place and form a hollow fibre precursor, externally to a coagulation bath;

(d) said precursor is fed to an aqueous bath to complete the coagulation, by operating in the absence, or substantial absence, of stretch, and form a hollow fibre of PPO—OH, and (e) the coagulated fibre is submitted to stretching, by operating in the same coagulation bath or in a further aqueous bath, and a stretched hollow fibre of PPO—OH is recovered.

The PPO—OH useful for the purposes of the present invention can be obtained according to the process as generally disclosed in European patent application publ. No. 360,318, cited hereinabove. More particularly, according to said process a PPO [poly-(2,6-dimethyl-p-oxyphenylene)], with a numeral average molecular weight comprised within the range of from about 15,000 to about 25,000 is metalated with a metalating agent constituted by an (alkali metal)-$(C_1-C_{12})$-alkyl, or with an alkali-metal hydride or amide, with a ratio of the number of mol of the metalating agent to the monomeric units in PPO macromolecules, comprised within the range of from 0.1:1 to 1:1, by operating in an inert organic solvent, at a temperature comprised within the range of from $-30°$ to $80°$ C., to obtain a metalated PPO. The latter is caused to react with ethylene oxide in an amount at least equivalent to the alkali metal in the metalated PPO, by operating in an inert organic solvent, at a temperature comprised within the range of from $-30°$ to $80°$ C., to obtain the PPO—OH useful for being transformed into fibres. Said PPO—OH contains x units hydroxy-ethylated on the methyl group, y units hydroxyethylated on the ring, z unchanged units and, as a function of the treatment conditions, it may contain w units containing a vinyl function bonded to the ring, with the various units being in such mutual ratios as indicated hereinabove.

When the process of the present invention is practiced, a solution ("viscose") of PPO—OH in 1-formyl-piperidine is prepared. The present Applicant found that the use of 1-formyl-piperidine as solvent is critic in order to obtain hollow fibres having the desired characteristics. In fact, other aprotic, polar solvents, such as dimethyl-acetamide, dioxane, methylpyrrolidone, tetramethyl-urea and formyl-morpholine, which are capable of dissolving PPO—OH and producing asymmetric membranes by the phase-reversal technique, when are used in the process according to the present invention, do not make it possible hollow fibres to be obtained which have the desired characteristics, and, in particular, they do not make it possible a hollow fibre with a macroporous backing to be obtained.

The viscose used in the instant process is prepared by dissolving PPO—OH in 1-formyl-piperidine until said solution contains a concentration of from 25 to 30% by weight of said polymer, by operating at temperatures of from $40°$ to $60°$ C., and the resulting viscose is submitted to filtration and degassing, and is fed, at the same temperature, to the spinnerette.

The spinnerette suitable for the intended purpose is a spinnerette for hollow fibres, of the "tube-in-orifice" type, constituted by an annular orifice through which the viscose is extruded, and additionally containing a central bore, for water feed. Said spinnerette typically has an outer diameter of the annular orifice of 600 $\mu m$, and an inner diameter of said annular orifice of the order of 400 $\mu m$, and the central bore thereof has a diameter of 200 $\mu m$.

According to the present invention, to the central bore of the spinnerette water is fed in order to cause the polymer to partially coagulate and form a hollow fibre precursor, by operating outside of the coagulation bath. Advantageously, water fed to the central bore of the spinnerette will be with a temperature of from $25°$ to $35°$ C., and the partial coagulation of the fibre will be carried out in air at room conditions ($20°-25°$ C.) for a time of the order of 1-2 seconds.

According to the present invention, it was found that the pre-coagulation of the fibre, carried out according to such modalities as reported hereinabove, is critic in order to obtain an end hollow fibre free, or essentially free, from structural defects.

The pre-coagulated fibre is then fed to an aqueous coagulation bath with a content of 1-formyl-piperidine smaller than 1% by weight. The aqueous bath is kept at a temperature of from $25°$ to $35°$ C., and the coagulation of the fibre is completed in the absence, or substantial absence, of stretch. According to the present invention it was found that the absence of stretch, during the coagulation completion step, contributes to the obtainment of hollow fibres which are free from structural faults.

The resulting hollow fibre is subsequently submitted to stretch by means of two rollers partially dipped in an aqueous bath and revolving at suitable speeds for supplying the fibre with a stretch, with a stretch ratio of from 1.1 to 1.15. The stretching can be carried out in the same coagulation bath, or in a stretching bath different from the coagulation bath.

In that way, the hollow fibre of PPO—OH according to the present invention is obtained. Said fibre is collected, washed with water and dried.

This hollow fibre is highly pervious and selective in the separation of such gases as methane, carbon dioxide, nitrogen, oxygen, hydrogen and hydrogen sulfide. Therefore, the hollow fibre according to the present invention, arranged as suitable modules, finds use in the technical sector of gas mixtures separation.

The following experimental examples are reported for the purpose of better illustrating the present invention.

In these examples, an amorphous PPO—OH is used, which shows a glass transition temperature of $215°$ C., a numeral average molecular weight of the order of 20,000, and, per each 100 monomeric units, $x=36$, $y=16$, $z=45$ and $w=3$.

EXAMPLES 1-14

PPO—OH and 1-formyl-piperidine solvent are charged to a glass reactor of 2 liters of capacity equipped with blade stirring means, and the resulting mass is kept with stirring and heating, until a solution of the polymer in the solvent (viscose) is obtained. The resulting solution is filtered through a stainless-steel net of about 32,000 meshes per cm$^2$, is left standing for 10-15 minutes and then is de-aerated.

In Table 1, the following values are reported:

the temperature of dissolution of the polymer in the solvent, expressed as degrees Celsius (Dissolution Temperature, ° C.);

the time needed for the polymer to get dissolved in the solvent, expressed as hours (Dissolution Time, hours);

the concentration of the viscose, expressed as percent by weight (Viscose Concentration, % w/w);

the temperature at which viscose is filtered, expressed as degrees Celsius (Filtration Temperature, ° C.);

the de-aeration time, expressed as hours (De-aeration Time, hours)

the de-aeration temperature, expressed as degrees Celsius (De-aeration Temperature, ° C.).

of about 100 cm and over a predetermined time, before being dipped into the aqueous coagulation bath.

Said aqueous coagulation bath is constituted by tap water, and contains three fibre driving rollers, partially dipped inside the bath, which are caused to revolve at a predetermined revolution speed. The coagulation takes place in the substantial absence of stretch. The stretch, in a ratio of the order of magnitude of 1.1-1.15, is supplied to the coagulated fibre between the second and the third rollers. On leaving the coagulation bath, the coagulated and stretched fibre is wound on a reel with eight arms, partially dipped in tap water. At the end of the test, the fibre skein is taken from the reel, is cut, and the cut pieces as collected in one single bundle. The fibre bundle, cut on the cutting machine to the length of 35 cm, is left overnight dipped in running tap water, in order to remove any traces of solvent. The bundle is then dried in a temperature-controlled chamber at 25° C., with an atmosphere humidity of 40%, for 4-5 hours. The dried fibre bundle is wrapped inside a wrap constituted by a thin aluminum foil and is stored inside a closed container, at room temperature.

In following Table 2, the values of:

rate of polymer feeding to the spinnerette, expressed as grams/hour (Polymer Feed Rate, g/hour);

TABLE 1

| Example No. | Dissolution Temperature, °C. | Dissolution Time, hours | Viscose Concentration, % w/w | Filtration Temperature °C. | De-aeration Time, hours | De-aeration Temperature, °C. |
|---|---|---|---|---|---|---|
| 1 | 65 | 6 | 25 | 40 | 12/15 | 25 |
| 2 | 65 | 6 | 30 | 40 | 12/15 | 25 |
| 3 | 65 | 6 | 30 | 40 | 12/15 | 25 |
| 4 | 65 | 6 | 30 | 60 | 12/15 | 25 |
| 5 | 65 | 6 | 30 | 60 | 12/15 | 25 |
| 6 | 65 | 6 | 30 | 40 | 12/15 | 25 |
| 7 | 65 | 6 | 25 | 50 | 12/15 | 25 |
| 8 | 65 | 6 | 30 | 50 | 12/15 | 25 |
| 9 | 65 | 6 | 30 | 50 | 12/15 | 25 |
| 10 | 65 | 6 | 30 | 50 | 12/15 | 25 |
| 11 | 65 | 6 | 30 | 60 | 12/15 | 25 |
| 12 | 65 | 6 | 30 | 60 | 12/15 | 25 |
| 13 | 65 | 6 | 30 | 50 | 12/15 | 25 |
| 14 | 65 | 6 | 28 | 60 | 12/15 | 25 |

When de-aeration is complete, the viscose is caused to flow, by means of a metering pump, through a filter consisting of a stainless-steel wire net with about 32,000 meshes/cm$^2$, and is extruded through a spinnerette of stainless steel arranged above the coagulation bath, perpendicularly to it.

The bottom surface of the spinnerette, facing towards the bath, is provided with two coaxial openings and, namely, a central bore of 200 μm of diameter, for the passage of the coagulation liquid, and an outer opening, of 600 μm of diameter, for the extrusion of viscose. The coagulation liquid is constituted by distilled water and is fed to the central bore of the spinnerette from a tank kept at a prefixed temperature, by means of a metering pump. In this way, the coagulation liquid and viscose come into contact at the outlet from the spinnerette, thus forming a precursor of the fibre, which is kept in air at room temperature (20°-25° C.) along a path length temperature of viscose fed to the spinnerette, expressed as degrees Celsius (Viscose Temp., ° C.);

rate of coagulation liquid feeding to the central spinnerette bore, expressed as grams/hour (Liquid Feed Rate, g/hour);

the temperature of the coagulation liquid fed to the central bore of the spinnerette, expressed as degrees Celsius (Liquid Temp., ° C.);

the stay time of the fibre precursor in air, expressed as seconds (Prec. Time, sec);

the temperature of the aqueous coagulation bath, expressed as degrees Celsius (Bath Temp., ° C.);

the surface speed of the three rollers in the coagulation bath, expressed as meters/minute (R1, m/min; R2, m/min; and R3, m/min), and the collection speed of the reel, expressed as meters/minute (Reel Speed, m/min).

TABLE 2

| Example No. | Polymer Feed rate, g/hour | Viscose Temp., °C. | Liquid Feed rate, g/hour | Liquid Temp., °C. | Prec. Time, sec | Bath Temp., °C. | R1, m/min | R2, m/min | R3, m/min | Reel Speed, m/min |
|---|---|---|---|---|---|---|---|---|---|---|
| 1 | 192 | 40 | 121 | 35 | 1.4 | 35 | 15 | 16 | 16 | 16 |
| 2 | 149 | 40 | 93 | 35 | 1.4 | 25 | 15 | 15 | 16 | 16 |
| 3 | 194 | 40 | 158 | 35 | 1.4 | 25 | 15 | 15 | 16 | 16 |
| 4 | 147 | 60 | 93 | 25 | 1.4 | 35 | 15 | 15 | 15 | 15 |
| 5 | 191 | 60 | 158 | 25 | 1.4 | 35 | 15 | 15 | 15 | 15 |

TABLE 2-continued

| Example No. | Polymer Feed rate, g/hour | Viscose Temp., °C | Liquid Feed rate, g/hour | Liquid Temp., °C | Prec. Time, sec | Bath Temp., °C | R1. m/min | R2. m/min | R3. m/min | Reel Speed. m/min |
| --- | --- | --- | --- | --- | --- | --- | --- | --- | --- | --- |
| 6 | 151 | 40 | 124 | 25 | 1.7 | 25 | 12 | 12 | 12 | 12 |
| 7 | 128 | 50 | 93 | 30 | 1.6 | 30 | 13 | 13 | 13 | 13 |
| 8 | 128 | 50 | 93 | 30 | 1.6 | 30 | 13 | 13 | 14 | 14 |
| 9 | 147 | 50 | 107 | 30 | 1.6 | 30 | 13 | 13 | 13 | 13 |
| 10 | 166 | 50 | 122 | 30 | 1.6 | 30 | 13 | 13 | 13 | 13 |
| 11 | 190 | 60 | 158 | 25 | 1.4 | 35 | 15 | 15 | 15 | 15 |
| 12 | 147 | 60 | 93 | 25 | 1.4 | 35 | 15 | 16 | 17 | 17 |
| 13 | 140 | 60 | 115 | 25 | 1.9 | 35 | 11 | 11 | 12 | 12 |
| 14 | 129 | 50 | 87 | 25 | 1.9 | 30 | 11 | 11 | 12 | 12 |

The hollow fibres obtained as said are submitted to the determination of their geometric characteristics, i.e.:
 inner diameter, as $\mu m$;
 outer diameter, as $\mu m$; and
 wall thickness, as $\mu m$.

In particular, the diameters and the wall thickness are calculated by multiplying the average value obtained from the reading under the optical microscope (NIKON microscope at 40×), of ten fibre samples, times a conversion factor which directly supplies the value as $\mu m$.

In following Table 3, the values are reported of the geometric characteristics obtained for the hollows fibres of the Examples 1-14.

TABLE 3

| Example No. | Outer Diameter ($\mu m$) | Inner Diameter ($\mu m$) | Thickness ($\mu m$) |
| --- | --- | --- | --- |
| 1 | 475 | 305 | 85 |
| 2 | 450 | 300 | 75 |
| 3 | 500 | 390 | 55 |
| 4 | 515 | 345 | 85 |
| 5 | 450 | 275 | 87.5 |
| 6 | 500 | 305 | 97.5 |
| 7 | 450 | 265 | 92.5 |
| 8 | 445 | 260 | 92.5 |
| 9 | 465 | 285 | 90 |
| 10 | 500 | 310 | 95 |
| 11 | 530 | 315 | 107.5 |
| 12 | 460 | 265 | 97.5 |
| 13 | 505 | 310 | 97.5 |
| 14 | 450 | 275 | 87.5 |

Furthermore, the hollow fibres obtained in the Examples 1-14 are submitted to the determination of their count and mechanical characteristics.

More particularly, the count is determined by calculating the average value of dry weights of fibres of known length. The unit of measure is the "tex", which is defined as "the amount of polymer, expressed as grams, corresponding to 1 km of fibre". The law which makes it possible the count value to be predicted, can be obtained from a simple material balance. In fact, if with $Q_p$ the polymer feed flowrate, with $X_p$ the concentration of the polymer and with $V_3$ the surface speed of the third roller are indicated, the count of the fibre can be expressed, by using consistent measure units, with the expression:

$$T = \frac{Q_p \cdot X_p}{V_3}$$

The measured values of count of the fibres obtained in Examples 1-14 are reported in Table 4.

Furthermore, the mechanical properties of the fibres are determined by submitting 10 fibre samples to axial tensile stress, by means of a FAREGRAF-M dynamometer. This instrument, normally used for the tensile tests in textile industry, yields the average value of the ultimate tensile strength (kg/cm$^2$) and the tensile stress at an elongation of 10%, besides the % elongation of the fibre at break, and under a load of 25 g.

In following Table 4, the values of the mechanical characteristics are reported.

TABLE 4

| Example No. | Count (g/km) | Tensile Strength (kg/cm$^2$) | Elongation at Break (%) |
| --- | --- | --- | --- |
| 1 | 51.1 | 183 | 32 |
| 2 | 48.8 | 281 | 35 |
| 3 | 62.7 | 342 | 35 |
| 4 | 67.8 | 186 | 42 |
| 5 | 51.8 | 201 | 5 |
| 6 | 40.6 | | |
| 7 | 47.3 | 165 | 16 |
| 8 | 43.3 | 164 | 14 |
| 9 | 51.7 | 169 | 15 |
| 10 | 60.9 | 171 | 10 |
| 11 | 64.4 | 148 | |
| 12 | 43.0 | 149 | 18 |
| 13 | 58.7 | 164 | 9 |
| 14 | 40.2 | | |

Finally, some from the fibres obtained in Examples 1-14 are submitted to the determination of their transport characteristics, and namely:
 permeance for $O_2$
 permeance for $N_2$
 permeance for $CO_2$
 permeance for $CH_4$
 $O_2/N_2$ selectivity
 $CH_4/CO_2$ selectivity.

The permeability of a material for a certain gas is defined by means of a coefficient, i.e., the "permeability coefficient" (P). Such a coefficient, an inherent material property, represents the amount of gas which succeeds in flowing through a membrane with unit values of surface-area and thickness when, at a determined temperature, a unit pressure drop is applied.

The unit of measure with which the permeability is expressed is, in general:

[cm$_3$·cm/cm$^2$·cm$_{Hg}$·s].

On considering the low values which generally are measured, a unit, designated "Barrer" is adopted, which is defined as follows:

$10^{-10}$cm$_3$·cm/cm$^2$·cm$_{Hg}$·s = 1 Barrer.

A microphotograph obtained on the scanning electron microscope (SEM), of a cross section of the fibre evidences a large porous region (the "macroporous backing"), and a denser region, designated the "active layer" or "skin". The thickness of this active layer is not easy to be quantified and, due to this reason, in lieu of permeability, people use to refer to the "permeance" of a membrane. The permeance of a hollow fibre is the amount of gas which, during a unit time, flows through the unit surface-area of said membrane when, at a determined temperature, a unit pressure drop is applied. The permeance is expressed as

[cm$_3$/cm$^2$·cm$_{Hg}$·s].

In following Table 5, the values of:
permeance for O$_2$: P O$_2$
permeance for N$_2$: P N$_2$
permeance for CO$_2$: P CO$_2$
permeance for CH$_4$: P CH$_4$
O$_2$/N$_2$ selectivity: $\alpha$O$_2$/N$_2$
CH$_4$/CO$_2$ selectivity: $\alpha$CH$_4$/CO$_2$
are reported for some of the fibres obtained in the Experimental Examples.

TABLE 5

| Example No. | P O$_2$* | P N$_2$* | $\alpha$ O$_2$/N$_2$ | P CO$_2$* | P CH$_4$* | $\alpha$ CH$_4$/CO$_2$ |
|---|---|---|---|---|---|---|
| 2 | 3.1 | 1.5 | 2.1 | 8.2 | 2.1 | 4 |
| 4 | 0.85 | 0.38 | 2.2 | 2.3 | 0.44 | 5.2 |
| 5 | 0.61 | 0.24 | 2.5 | 2.5 | 0.41 | 6.1 |
| 6 | 5.2 | 2.4 | 2.1 | 19.1 | 4.1 | 4.7 |
| 6** | 4.6 | 1.4 | 3.3 | 16.8 | 1.0 | 16.8 |
| 9 | 1.25 | 0.5 | 2.5 | 3.62 | 0.88 | 4.1 |

*expressed as 10$^{-6}$ cm$^3$·cm$^{-2}$·cm$_{Hg}^{-1}$·s$^{-1}$.
**in this Example, the fiber was pre-coated with an elastomer of siliconic type, by operating as follows The end of the fibre obtained in Example 6, having a length of approximately 10 cm, is incorporated in a support by means of a glue of paraffinic type. The adhesive-bonding is so carried out, as to leave open and pervious the internal bore of the fibre. The other end is sealed. The so prepared fibre is dipped into a coating solution consisting of an elastomer of siliconic type, at 2% by weight in isopentane, at a temperature of approximately 21° C. At the open-end side, vacuum (160 mm$_{Hg}$) is applied for 7 minutes. The fibre is subsequently allowed to dry in air at room temperature.

The permeability coefficients of the polymeric material used for preparing the hollow fibres are:
CO$_2$ = 25.4 barrer
CH$_4$ = 1.6 barrer
O$_2$ = 4.7 barrer
N$_2$ = 1.4 barrer
and the selectivities are as follows:
CO$_2$/CH$_4$ = 15.9
O$_2$/N$_2$ = 3.4.

The selectivity displayed by the hollow fibres of Examples 6** is equal to the selectivity of the material. In this case, by dividing the permeability coefficient by the permeance of the fibres for the same gas, one can calculate the active skin thickness value, which results to be of the order of 1–1.5 $\mu$m.

We claim:
1. The hollow fibre of amorphous, hydroxyethylated poly-(2,6-dimethyl-p-oxyphenylene) (PPO—OH) with glass transition temperatures (Tg) of from 180° to 200° C., containing in its macromolecule the following units:

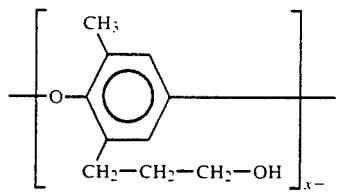

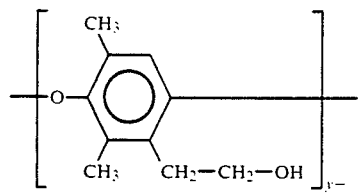

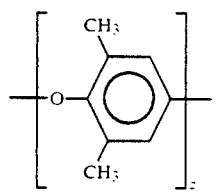

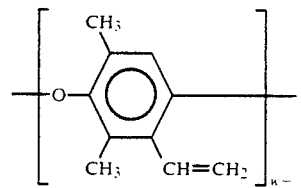

wherein the monomeric units are randomly distributed along the macromolecular chain, and wherein, per each 100 total units (x+y+z+w=100), the x units are comprised within the range of from 30 to 40, the y units are comprised within the range of from 10 to 20, the z units are comprised within the range of from 30 to 60, the w units are comprised within the range of from 0 to 10; with the fibre furthermore consisting of a thin, dense, layer on a macroporous backing, and having an outer diameter comprised within the range of from 450 to 550 $\mu$m; and an inner diameter comprised within the range of from 250 to 400 $\mu$m.

2. Hollow fibre according to claim 1, characterized in that per each 100 total units in PPO—OH, the x units are comprised within the range of from 33 to 38, the y units are comprised within the range of from 13 to 18, the z units are comprised within the range of from 39 to 54, the w units are comprised within the range of from 0 to 5.

3. Hollow fibre according to claim 1, characterized in that it shows the following permeance values: for oxygen $\geq$0.5, for nitrogen $\geq$0.2, for carbon dioxide $\geq$2 and for methane $\geq$0.4$\times$10$^{-6}$ [STP] cm$^3$/cm$^2$·s·cm$^{Hg}$.

* * * * *